Jan. 3, 1967  D. E. HARPFER ETAL  3,296,051
METHOD AND APPARATUS FOR CONTINUOUSLY MAKING
FIBER REINFORCED HOSE
Filed July 21, 1960  3 Sheets-Sheet 1
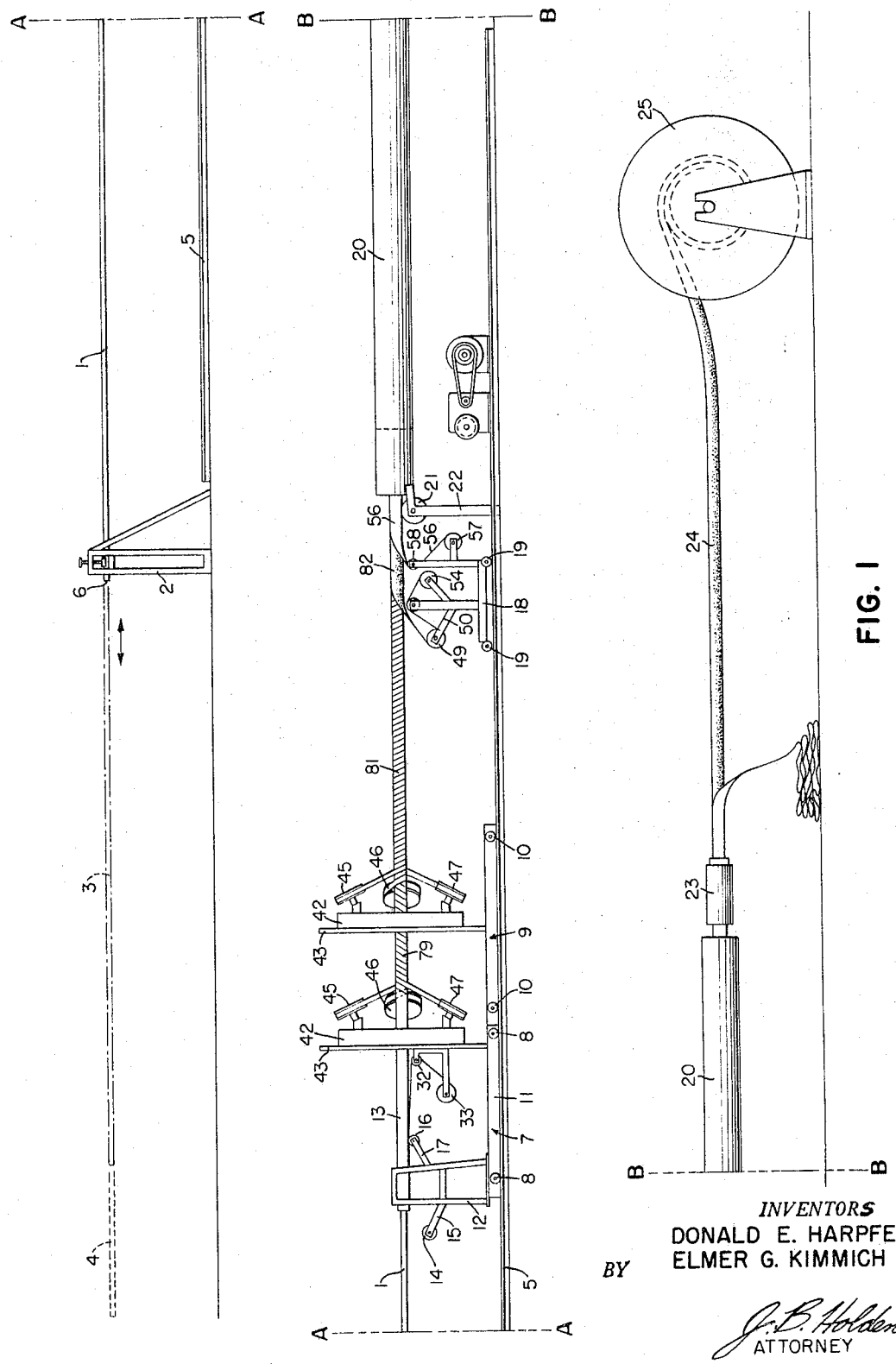
FIG. 1
INVENTORS
DONALD E. HARPFER
ELMER G. KIMMICH
BY
ATTORNEY

INVENTORS
DONALD E. HARPFER
BY ELMER G. KIMMICH

J.B. Holden
ATTORNEY

United States Patent Office 3,296,051
Patented Jan. 3, 1967

3,296,051
METHOD AND APPARATUS FOR CONTINUOUSLY MAKING FIBER REINFORCED HOSE
Donald E. Harpfer and Elmer G. Kimmich, Akron, Ohio, assignors to The Goodyear Tire & Rubber Company, Akron, Ohio, a corporation of Ohio
Filed July 21, 1960, Ser. No. 44,432
14 Claims. (Cl. 156—190)

This invention relates to a method and apparatus for the manufacture of large diameter long length hose.

There has existed for some time the need for extremely long lengths of large diameter hose which may be used to transport materials such as fuels from storage areas to dispensing stations without the need for coupling a large number of sections of hose together. Such a system has been found to be particularly desirable for use in military or quasi-military operations where it is obviously difficult to couple a multitude of relatively short lengths of hose together. However, it has heretofore been difficult to make long lengths of large diameter hose in any fashion other than making a plurality of short lengths and either coupling them together or splicing them either prior to or after vulcanization. Even in the latter case the length of hose which could be made is limited by the capacity of the particular vulcanization apparatus utilized. The present invention successfully solves the problem of manufacturing long length, uncoupled, unspliced hose of large diameters. For example, utilizing the apparatus and method of the present invention a number of 500 foot lengths of hose of approximately 4 inch diameter have been successfully made. As will appear as the description of the invention proceeds, there is virtually no limit to the length of hose which may be manufactured utilizing the apparatus and method about to be described.

It is an object of the present invention to provide a method and apparatus for manufacturing large diameter, long length hose. It is a further object of the present invention to provide means for manufacturing long lengths of large diameter hose in a substantially continuous fashion. It is a still further object of the present invention to provide means for manufacturing large diameter, long length hose in a manner which obviates the limitations normally placed on any process due to the capacity of the vulcanization apparatus. These and other objects of the present invention will become apparent from the following description and drawings in which:

FIG. 1 illustrates an overall view of the apparatus utilized to manufacture hose;

Figure 2:
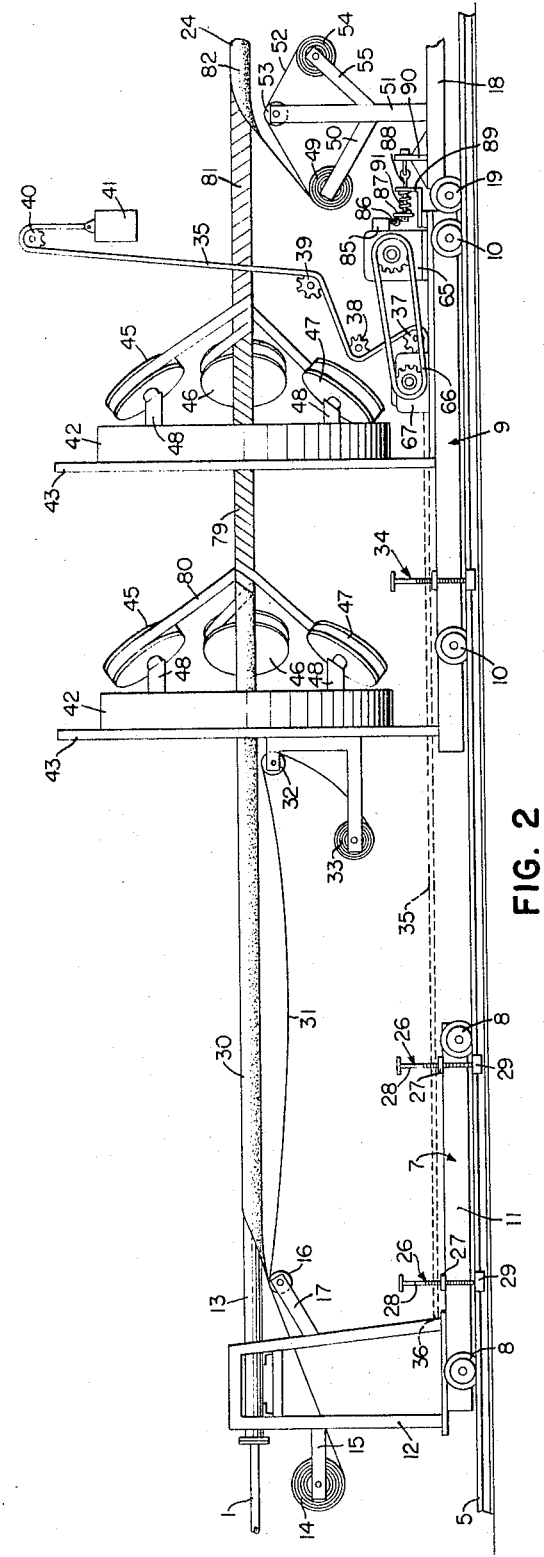
FIG. 2 is a side elevation of the portion of the apparatus utilized to manufacture the unvulcanized hose.

Referring to FIG. 1, the upper portion of the drawing illustrates the end of the apparatus farthest removed from the vulcanization chamber and comprises airbag pipe 1 slidably clamped on vertical stand 2. The airbag pipe may be moved horizontally back and forth from the position illustrated to the position indicated by the broken lines 3 and 4. Rails or tracks 5 are located at the base of stand 2 and extend from the stand towards the vulcanization apparatus which will be subsequently described. Airbag pipe 1 may be pressured with air or any other convenient fluid from the end 6 through conventional air supply and valve means (not shown). The portion of FIG. 1 between section lines A—A and B—B illustrates the hose building and vulcanization apparatus. As can be seen the rails 5 extend from the airbag pipe stand 2 to the hose building apparatus and as will later be apparent all the way to the vulcanization chamber in which the hose is cured. A mandrel carriage 7 having flanged wheels 8 riding on rails 5 is located between the airbag pipe stand 2 and the hose wrapping carriage 9 which is similarly mounted on the rails 5 by means of flanged wheels 10. The mandrel carriage comprises a base 11 having a vertical stand 12 on which is mounted building mandrel 13 which is clamped to stand 12 and extends from the stand in the direction of the vulcanization apparatus. As will be later apparent the mandrel 13 may be of a variety of diameters depending on the cross section desired in the hose. The stand 12 has a gum stock carriage 14 mounted on one side by means of arms 15 and a liner guide roll 16 attached to the other side by means of arms 17. Between the mandrel carriage 7 and the vulcanization apparatus are located the hose winding carriage 9 and the liner carriage 18. The latter is also provided with flanged wheels 19 and mounted on the rails 5. Details of the winder carriage and its operation and the liner carriage will be described subsequently and may be seen in FIGS. 2 and 3. The vulcanization apparatus 20 is located at the extreme end opposite the airbag stand 2 and as will be later apparent comprises a hollow cylinder having a steam jacket about the periphery thereof. A hose supporting roll 21 is rotatably mounted on vertical legs 22 at the entry portion of the vulcanization apparatus 20. The vulcanization apparatus as illustrated extends beyond the section line B—B and has cooling jackets 23 at either end. After vulcanization the hose 24 is extracted from the vulcanization chamber 20 and is conveniently stored on the wind-up apparatus 5.

Details of the hose building portion of the apparatus may be seen in FIG. 2. The mandrel carriage 7 comprises horizontal base 11 having rotatably mounted thereon flanged wheels 8 which ride on the rails 5. The carriage is provided with two locking clamps 26 consisting of brackets 27 which are attached to the member 11. Vertical rods 28 are threadably mounted in the brackets 27 and terminate in a block 29 which when the rods 28 are rotated counter-clockwise lock against the under-edge of the rails 5 and thereby secure the mandrel cart to the rails at any convenient position. It is obvious, of course, that other carriage locking means may be employed. A vertical stand 12 is mounted at one end of the horizontal member 11 and bears the mandrel 13. The mandrel 13 is clamped to the stand 12 by a conventional means which need not be described here. As can be seen the mandrel 13 is hollow so that the airbag pipe 1 may extend therethrough. Roll 14 which carries the gum stock for the inner elastomeric tube of the hose, together with its protective liner, is mounted to stand 12 by means of arms 15. Liner guide roll 16 is similarly mounted to the stand 12 by means of arms 17. As can be seen when the gum stock 30 is wrapped about the mandrel 13, the liner 31 passes over roll 16 and to a similar roll 32 on the winder carriage. The liner 31 then passes over roll 32 and down to the storage roll 33 conveniently mounted on the winder carriage.

The winder or wrapper carriage comprises horizontal member 9 having flanged wheels 10 which ride on rails 5 in a manner similar to the mandrel carriage. Locking means 34 similar to those previously described are provided on the winder carriage and may be utilized to lock the carriage in position when required. The winder carriage and the mandrel carriage are linked together by means of the mechanism comprising chain 35, one end of which is connected to the mandrel carriage by any convenient means at point 36. The chain extends to the winder carriage and over the sprockets 37, 38, 39, and 40 and terminates in counter weight 41. The winder carriage is pulled to the mandrel cart or carriage by means of the chain 35 through a drive mechanism which will be described in detail with regard to FIG. 3. Two wrapping mechanisms are mounted on the winder carriage and are of similar construction except for the direction of rotation. A wrapping mechanism comprises circular housing 42 mounted on vertical bracket 43. As will be seen in FIG. 3, the housing contains large internally toothed gear or ring 44 to which are attached the fabric or wrapper rolls 45, 46, and 47 which are rotatably mounted on support 48. The fabric rolls are disposed in equally spaced relationship about the circumference of the gear 44. In the mechanism shown, there are three fabric rolls that are 120 degrees apart. It will be apparent that a greater or lesser number of fabric rolls may be utilized depending on the type of wrap that is desired in a particular construction. Furthermore, additional rolls or bobbins may be provided where auxiliary wraps of wire or other materials are desired for a particular hose construction.

The liner carriage 18 is disposed between the winder carriage and the vulcanization apparatus and is provided with flanged wheels 19 which ride on the rails 5. The roll 49 carries outer elastomeric tube material together with its protective liner and is mounted on the carriage 18 by means of arm 50 attached to vertical support 51. As the outer gum stock is wrapped about the fabric-wound tube, the protective liner 52 passes over guide roll 53 at the top of support 51 and is wound up on roll 54 attached to support 51 by means of arm 55. As will be seen in FIG. 1, a pull liner 56 is provided for the hose from roll 57 mounted on one end of the carriage 18. The pull liner 56 passes over roll 58 and is applied to the completed unvulcanized hose in a manner which will subsequently be described.

Figure 3:
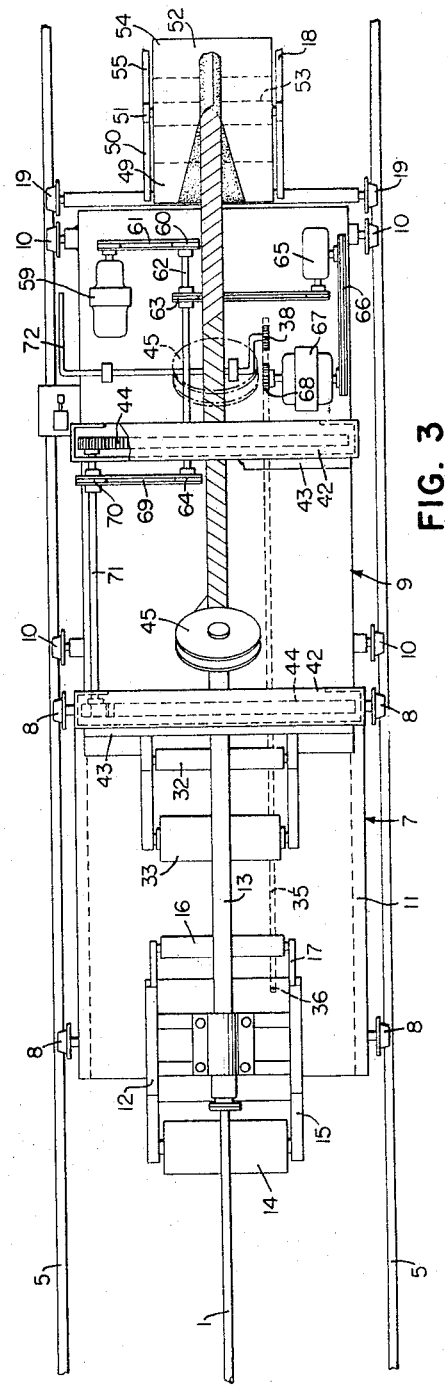
FIG. 3 is a top plan view of the apparatus illustrated in FIG. 2.

Additional details of the hose building apparatus can be seen by an examination of FIG. 3. The drive mechanism for the various portions of the winding apparatus comprises motor 59 which drives pulley 60 through a conventional belt or chain 61. Pulley 60 is attached to rotatable shaft 62 on which is mounted pulley 63 and pulley 64. A conventional belt or chain drive connects pulley 63 with a gear reduction 65. The output from the gear reduction 65 is connected through a conventional drive means 66 to a positive infinitely variable drive 67 which in turn drives cog wheel 68 connected to chain 35 through which means the winder carriage is pulled to the mandrel carriage during the hose building operation. Pulley 64 is connected by means of a belt or chain 69 to pulley 70 pinioned to shaft 71. Conventional gears are mounted on each end of shaft 71 and engage the internal teeth of gear 44 to drive the wrapping mechanisms. The counter weight 41 and its associated chain 35 are engaged and disengaged from the cog wheel 68 by means of pivotable lever arm 72 mounted on the winder carriage and terminated by sprocket 38.

Figure 4:
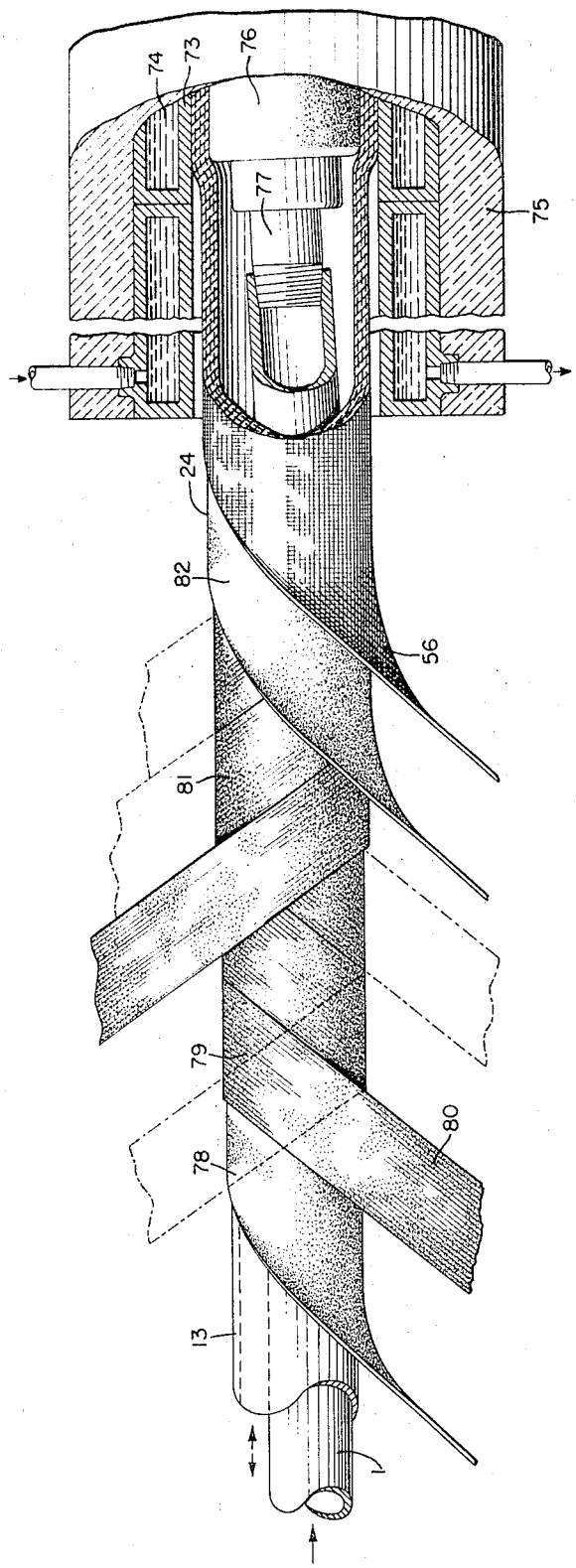
FIG. 4 is an illustration of a portion of the completed hose prior to entry into the vulcanization apparatus.

FIG. 4 illustrates the relationship of the vulcanization apparatus, the building mandrel, and the hose structure. The vulcanization apparatus comprises a hollow cylindrical pipe 73 having a steam chamber 74 about the outer periphery thereof. The steam chamber is covered with a suitable insulating material 75 to conserve heat. After the hose is built, it is fed into the vulcanization chamber with the airbag or curing tube 76 in the hose interior. After a length of hose is introduced into the chamber, the curing tube 76 is inflated to force the hose out against the smooth interior surface of the curing chamber and the hose is cured by means of the admission of steam to the chamber 74. As will be seen from FIG. 4, the air pipe 1, the mandrel 13, and the completed hose indicated generally by the numeral 24 are all concentric with respect to each other. The airbag pipe 1 is coupled to the curing tube 76 by means of a conventional threaded nipple assembly 77. Prior to its introduction into the vulcanization chamber the hose 24 is wrapped with one ply of a relatively porous but strong fabric liner 56 which functions to permit air which may be trapped on the exterior surface of the hose to wick down the fabric liner and out of the vulcanization chamber, thus preventing surface defects in the hose. In addition to this the fabric liner provides a means by which a vulcanized section of hose may be removed from the chamber and a following section of unvulcanized hose introduced into the curing apparatus without damage to the green hose since during cure the liner adheres to the hose. Thus when force is placed on the cured hose to extract it from the chamber the tension is transmitted to the liner which absorbs the force on the uncured portion of the hose and pulls it into the chamber with minimum risk of pulling the green hose structure apart. After each section of cured hose 24 is removed from the vulcanization chamber 20, the outer fabric liner 56 is removed.

Although a variety of hose structures may be manufactured by the apparatus described, the particular construction illustrated in FIG. 4 has been found to be extremely satisfactory for the purposes of large diameter hose for delivery of large quantities of fuel. The hose illustrated comprises inner elastomeric tube 78 having superimposed thereon a fabric wrap 79 consisting of elastomer-coated tire fabric 80. A second and oppositely disposed fabric wrap 81 of similar material is then applied and the entire structure is enclosed in an outer rubber layer 82. For certain purposes, particularly in fuel installations, it is desirable to provide a measure of protection against the possibility of explosion due to static charge and therefore the elastomer utilized in the hose is preferably a conductive rubber.

In a typical hose building operation the process is commenced with the mandrel carriage, the winder carriage, and the liner carriage together and at the heater or vulcanization chamber end of the rails. The winder carriage is locked in position by means of the rail clamps previously described and the mandrel carriage is maintained in an unlocked condition to permit its movement away from the heater and toward the airbag stand. The chain drive system between the winder and the mandrel carriages is disengaged by means of the lever 72 shown in FIG. 3. The mandrel carriage is then moved away from the heater a convenient distance which in practice is limited by the length of building mandrel which can be physically supported from one end only at the mandrel carriage. In practice, using building mandrels having outside diameters of 4 to 5 inches, it has been found that a mandrel approximately 20 feet in length may be utilized. When the mandrel carriage is moved away from the winder the length of the mandrel, it is locked in position and the first gum ply is wrapped about the mandrel which has first been coated lightly with a lubricant such as a silicone oil. The first gum ply is wrapped around the mandrel and stitched with a conventional stitching wheel to assure firm adhesion of the rubber gum. After the mandrel carriage is locked to the rails and the first ply put on the mandrel, the chain drive between the winder carriage and mandrel carriage is engaged, the winder carriage unlocked, and the motor started. The winding carriage is pulled to the mandrel carriage through the chain drive previously described, during which time the fabric wraps are automatically applied to the inner elastomeric tube. When this is complete the liner carriage is rolled down the rails to the winder and the second and outer gum stock is placed on the hose. This operation is repeated until the carriages are at the opposite end of the rails adjacent the air pipe stand. In order to free the completed hose from the mandrel, it has been found that it is only necessary to apply a few pounds of air pressure between the mandrel and the green hose. When a sufficient quantity of green hose has been built and removed by the retraction of the mandrel, the curing tube is deflated and pulled out of the heater and into the following section of green hose by unlocking the air pipe at the air pipe stand and retracting it the length of the curing tube. It has been found that it is convenient to have the building mandrel, the curing tube, and the curing chamber approximately the same length so that successive incremental lengths of hose can be built, bagged, and cured in a substantially continuous operation in which the period between the insertion of successive lengths of uncured hose into the curing chamber is determined by the cure time required for the particular hose structure. Immediately prior to the completion of the cure of one section of hose, the fabric liner is wrapped about the succeeding section of green hose and held in place by temporary tapes. Upon the completion of a cure the airbag is deflated and retracted into the following section of green hose in the manner previously described. The airbag pipe is left unclamped to its stand and is in turn attached by any convenient means to the mandrel carriage. Upon completion of the cure of a section of hose, force is applied to the cured hose at the exit end of the curing chamber either manually or by means of a motor driven winch and the next section of hose is pulled into the curing chamber through tension transmitted from the cured hose through the adhered liner while the cured section of hose is extracted. After the cured section of hose is removed from the curing chamber 20, the outer fabric liner 56 is removed from the hose. As the green hose enters the chamber, the temporary tapes are removed from the liner to assure an unblemished outer surface for the hose. During insertion of the green hose into the chamber the entire building assembly, including the airbag pipe, mandrel carriage, and winder carriage, is pulled toward the heater through tension of the fabric liner a distance equal to the incremental length of hose to be cured. In order to avoid excessive tension of the liner and the possibility of "necking down" of the hose during insertion of a section of green hose, a safety feature is provided between the winder and liner carriages. This feature, which may be seen in FIG. 2, comprises microswitch 85 whose actuating arm 86 is pressed against plate 87 mounted on the end of plunger 88. The plunger 88 passes through a hole in a bracket 89 on the winder carriage and is attached to a bracket 90 on the liner carriage. A spring 91 holds the plunger 88 against arm 86 under a predetermined pressure. As arranged the microswitch 85 is electrically normally closed and located in the power circuit of the motor being used to pull the cured hose out of the heater. If the tension on the hose and liner between the two carriages exceeds the spring pressure, the microswitch arm 86 is released to open the switch and de-energize the motor due to movement of the plate 87 away from the arm. If only manual force is being used on the liner, the microswitch 85 could be utilized to actuate a light or other warning device to indicate to the operator that the safe force has been exceeded for some reason.

It is clear that when a new section of hose is put into the chamber to be cured, the various portions of the mechanism are once again in position to permit building of a new section of green hose. Of course, for the purpose of the cure the airbag pipe is once again clamped to its stand and the curing tube pressured up by means of air to force the unvulcanized hose against the interior surface of the curing chamber. It will be appreciated that with the concentric arrangement of the airbag pipe, the building mandrel and the hose itself and the mobility of apparatus provided by the wheeled carriages, large diameter continuous lengths of hose of any desired lengths may be manufactured and vulcanized. As previously indicated, as much as 500 feet of hose has been built in one continuous length by means of the method and apparatus described. It is possible, of course, to build even greater lengths of hose as required for any particular operation. However, it has been found that as a practical matter the storage and shipment of hoses of greater lengths require such massive equipment that it is usually not desirable to exceed 500 feet for a hose of such large diameter. It is obvious, of course, that the mandrel utilized may have any desired diameter, the limiting factor being the length of mandrel which can be supported from one end only. While shorter mandrels may of necessity be used where the hose is of large diameter, nonetheless the ultimate result of the present invention is that an integral uncoupled hose of any desired length will result.

While certain representative embodiments and details have been shown for the purpose of illustrating the invention, it will be apparent to those skilled in this art that various changes and modifications may be made therein without departing from the spirit or scope of the invention.

We claim:

1. Apparatus for manufacturing long length unspliced hose comprising, in combination, a vulcanization chamber having a substantially smooth tubular bore therethrough adapted to receive unvulcanized hose said chamber having an entrance end and an exit end, movable hose wrap carriage means adjacent to the entrance end of said chamber to which unvulcanized hose is advanced, said wrap carriage means having mounted thereon hose wrap supply means, drive means coupled to said hose wrap carriage and adapted to move it to and from said chamber, movable building mandrel carriage means adjacent said wrap carriage means at the opposite end thereof from said chamber, said mandrel carriage means having a hollow building mandrel mounted thereon, means to couple said wrap carriage means and said mandrel carriage means, and airbag pipe stand means adjacent said mandrel carriage means at the opposite end thereof from said wrap carriage means, said airbag pipe stand means having airbag pipe releasably mounted thereon and extendable through said mandrel and said hose wrap means into said chamber, all of said carriage means being substantially longitudinally aligned with said vulcanization chamber.

2. Apparatus as claimed in claim 1 including movable liner carriage means between said wrap carriage and said chamber and adapted to supply a removable pull liner for said hose.

3. Apparatus as claimed in claim 1 including track means extending to said vulcanizing chamber along a line through said movable carriage means on which all of said movable carriage means ride.

4. Apparatus as claimed in claim 2 including means to couple said liner carriage means to said hose wrap carriage to permit movement of all three movable carriage means toward said vulcanization chamber as an integral unit.

5. Apparatus for manufacturing long length unspliced mandrel built hose comprising, in combination, a vulcanization chamber having a smooth tubular bore therethrough to receive the hose to be vulcanized, said bore having a diameter substantially equal to the desired finished outside diameter of the hose, movable liner carriage means adjacent said chamber and to the end thereof to which the unvulcanized hose is presented, movable hose wrap carriage means adjacent said liner carriage means and to the end thereof opposite said vulcanization chamber, said wrap carriage means having mounted thereon at least one rotatable ring means with a plurality of wrap bobbin means rotatably mounted thereon and so disposed to continuously supply hose wrap material to a location substantially centrally of said ring means, movable building mandrel means adjacent said wrap carriage means and to the end thereof opposite said liner carriage means, said mandrel carriage means having mounted thereon a hollow building mandrel having an outside diameter substantially equal to the finished inside diameter of the hose to be built thereon, said mandrel being so disposed to extend from said mandrel carriage means through the ring means on said wrap carriage means substantially centrally thereof, and airbag pipe stand means adjacent said mandrel carriage means and to the end thereof opposite said wrap carriage means, said airbag pipe stand means having curing tube means releasably mounted thereon and extendable through said hollow mandrel means and said hose wrap means into said vulcanization chamber, all of said carriage means being substantially longitudinally aligned with said vulcanization chamber.

6. Apparatus as claimed in claim 5 including track means extending to said vulcanizing chamber along a line through said movable carriage means on which all of said movable carriage means ride.

7. Apparatus as claimed in claim 6 including means to couple said movable carriage means together to permit movement of all of said carriage means as an integral unit.

8. A method of continuously manufacturing long length unspliced mandrel built hose comprising the steps of building on a mandrel length of hose of an incremental length which can be accommodated by the vulcanization apparatus to be used, building at least one additional incremental length of hose, moving said hose in incremental lengths at intervals into the vulcanizing apparatus while during each of said intervals vulcanizing an incremental length of hose and building at least one additional incremental length of hose, and repeating said steps until the desired length of vulcanized hose is obtained.

9. A method of manufacturing continuous long length mandrel built hose comprising the steps of building on a mandrel hose of incremental length sufficient to be accommodated by the vulcanization apparatus to be used, advancing said incremental length of hose off said mandrel and into said vulcanization apparatus, vulcanizing said incremental length of hose for a sufficient interval of time to cure it, building sufficient additional hose to provide unvulcanized hose of at least one additional incremental length, removing at the end of said interval the cured hose and simultaneously advancing the uncured increment of hose into said vulcanization apparatus, and repeating said building and vulcanizing steps until the desired length of vulcanized hose is obtained.

10. A method of manufacturing continuous long length unspliced hose comprising the steps of building on a mandrel sufficient hose to provide at least the necessary incremental length to be accommodated by the vulcanization apparatus to be used, covering the incremental length of hose, with a removable fabric liner removing said incremental length from said mandrel and advancing it into the vulcanization apparatus, curing said incremental length of hose with said fabric liner about it, building any additional hose required to provide at least one uncured incremental length of hose, removing at the end of said interval the cured hose and simultaneously advancing the uncured incremental length of hose into the vulcanization apparatus by the application of tractive force on said fabric liner, and repeating said building and vulcanizing until the desired length of vulcanized hose is obtained.

11. A method of manufacturing a fibre-reinforced hose of vulcanized elastomer, comprising supporting a length of unvulcanized hose on a mandrel, vulcanizing said length of hose in a vulcanizing chamber surrounding said mandrel, supporting elastomer layers and fibre layers adjacent a section of said mandrel extending from said vulcanizing chamber, carrying out a relative movement in the axial direction of said mandrel between said supporting means on one hand and said vulcanizing chamber and mandrel on the other hand while vulcanizing said length of unvulcanized hose, simultaneously feeding said elastomer layers and fibre layers onto said section of the mandrel and forming a new length of unvulcanized hose on said mandrel as a continuous extension of said first mentioned length of unvulcanized hose being simultaneously vulcanized, and then advancing said new length of unvulcanized hose in relation to said mandrel and vulcanizing chamber for positioning said new length of unvulcanized hose in said vulcanizing chamber.

12. A method of manufacturing a fibre-reinforced hose of vulcanized elastomer, comprising supporting a length of unvulcanized hose on a mandrel, vulcanizing said length of hose in a vulcanizing chamber surrounding said mandrel, supporting elastomer layers and fibre layers on supporting means adjacent a section of said mandrel extending from said vulcanizing chamber, carrying out a relative movement in the axial direction of said mandrel and a relative rotation around the axis of said mandrel between said supporting means on one hand and said vulcanizing chamber and mandrel on the other hand while vulcanizing said length of unvulcanized hose, simultaneously feeding said elastomer layers and fibre layers from said supporting means onto said section of the mandrel and forming said layers into a new length of unvulcanized hose on said mandrel as a continuous extension of said first mentioned length of unvulcanized hose being simultaneously vulcanized, and then advancing said new length of unvulcanized hose in relation to said mandrel and vulcanizing chamber for positioning the new length of unvulcanized hose in said vulcanizing chamber.

13. An apparatus for manufacturing a fibre-reinforced hose of vulcanizing elastomer, comprising a mandrel, supporting means for elastomer layers and fibre layers mounted along an axial portion of said mandrel, means for applying said layers to said mandrel to form a built up hose, a vulcanizing chamber spaced in the axial direction of said mandrel from said supporting means and surrounding said mandrel, means for inducing relative movement between said supporting means on one hand and said vulcanizing chamber and said mandrel on the other hand in the axial direction of said mandrel and means for vulcanizing said built up hose.

14. An apparatus for manufacturing a fibre reinforced hose of vulcanized elastomer, comprising a mandrel, supporting means for elastomer layers and fibre layers mounted along an axial portion of said mandrel, means for applying said layers to said mandrel to form a built up hose, a vulcanizing chamber spaced in the axial direction of said mandrel from said supporting means and surrounding said mandrel, means for inducing relative movement between said supporting means on one hand and said vulcanizing chamber and said mandrel on the other hand in the axial direction of said mandrel, means for inducing relative rotation between at least part of said supporting means on one hand and said vulcanizing chamber and said mandrel on the other hand around the axis of said mandrel and means for vulcanizing said built up hose.

References Cited by the Examiner
UNITED STATES PATENTS

| 1,129,084 | 2/1915 | Gammeter. |
| 3,083,130 | 3/1963 | Strandquist _____ 156—143 |

EARL M. BERGERT, *Primary Examiner.*

CARL F. KRAFFT, JOSEPH REBOLD, *Examiners.*

H. F. EPSTEIN, P. DIER, *Assistant Examiners.*